(12) United States Patent
Fant et al.

(10) Patent No.: US 6,950,215 B2
(45) Date of Patent: Sep. 27, 2005

(54) METHOD AND APPARATUS FOR MONITORING OPTICAL SWITCHES

(75) Inventors: Walt Fant, Los Gatos, CA (US); Roger J. Helkey, Montecito, CA (US); Tony Walter, San Jose, CA (US); Peter Hunt, Scotts Valley, CA (US); David Welsh, Goleta, CA (US)

(73) Assignee: Calient Networks, San Jose, CA (US)

( * ) Notice: Subject to any disclaimer, the term of this patent is extended or adjusted under 35 U.S.C. 154(b) by 375 days.

(21) Appl. No.: 09/904,103

(22) Filed: Jul. 11, 2001

(65) Prior Publication Data

US 2003/0012481 A1 Jan. 16, 2003

(51) Int. Cl.[7] .............................. G02B 6/26; G02B 6/42
(52) U.S. Cl. ............................. 359/16; 385/17; 385/20; 398/12; 398/19
(58) Field of Search .................... 385/16–19, 20–21, 385/24, 197; 398/12, 19; 356/73, 214, 215, 217, 219, 221; 359/109–111, 117, 189, 223, 224, 291, 292; 326/73 AT

(56) References Cited

U.S. PATENT DOCUMENTS

| | | | | |
|---|---|---|---|---|
| 3,776,616 A | * | 12/1973 | Douklias | 350/162 SF |
| 4,913,509 A | * | 4/1990 | Baker | 385/16 |
| 5,771,320 A | * | 6/1998 | Stone | 385/16 |
| 6,529,652 B1 | * | 3/2003 | Brener | 385/16 |
| 6,590,644 B1 | * | 7/2003 | Coin et al. | 356/218 |
| 2002/0064336 A1 | * | 5/2002 | Graves et al. | 385/17 |
| 2005/0058392 A1 | * | 3/2005 | Qian et al. | 385/18 |

FOREIGN PATENT DOCUMENTS

JP 0269890 A * 9/2000

OTHER PUBLICATIONS

U.S. Appl. No. 09/548,587, to Bowers, filed Apr. 13, 2000.
U.S. Appl. No. 09/805,528, to Welsh et al., filed Mar. 12, 2001.
U.S. Appl. No. to Blumenthal et al., filed May 10, 2001.

* cited by examiner

Primary Examiner—Leonidas Boutsikaris
(74) Attorney, Agent, or Firm—Beyer Weaver Thomas LLP

(57) ABSTRACT

An optical switching apparatus is provided. Generally, a plurality of optical input switches is provided. A plurality of optical output switches is provided. A plurality of central optical switches connected between the plurality of input switches and plurality of output switches is provided. A plurality of test light sources, where each test light source is connected to an optical input switch, is provided. A first plurality of optical detectors connected to the optical output switches is provided.

12 Claims, 7 Drawing Sheets

METHOD AND APPARATUS FOR MONITORING OPTICAL SWITCHES

RELATED APPLICATION DATA

The present application is related to U.S. patent application Ser. No. 09/548,587 for "FEEDBACK STABILIZATION OF A LOSS OPTIMIZED SWITCH" by John Bowers, filed on Apr. 13, 2000, the entirety of which is incorporated herein by reference for all purposes.

The present application is also related to U.S. patent application Ser. No. 09/805,528 for "AN OPTICAL SWITCH WITH INTERNAL MONITORING" by David Edward Welsh, Roger Jonathan Helkey, Adrian Keating, Daniel J. Blumenthal, and Walter Joseph Fant, filed on Mar. 12, 2001, the entirety of which is incorporated herein by reference for all purposes.

The present application is also related to U.S. patent application Ser. No. 09/854,265 for "PERFORMANCE MONITORING IN MULTI-STAGE SWITCHES" by Dan Blumenthal, Walt Fant, Roger Jonathan Helkey, and Charles Corbalis, filed on May 10, 2001, the entirety of which is incorporated by reference for all purposes.

FIELD OF THE INVENTION

The present invention relates generally to optical switches. More preferably the invention relates to the monitoring of optical switches.

BACKGROUND OF THE INVENTION

To facilitate discussion FIG. 1 is a schematic view of a single stage optical network 100 that may be used in the prior art. The optical network 100 may comprise a 256×256 active optical switch 108 and a 256×256 protection optical switch 112. The protection optical switch 112 acts as a backup for the active optical switch 108. A plurality of 1×2 input switches 116, 118, 120 have outputs connected to the input sides of the active optical switch 108 and the protection optical switch 112. A first ingress fiber 124 provides input to the first 1×2 input switch 116. A second ingress fiber 126 provides input to the second input switch 118. An nth ingress fiber 128 provides input to the nth input switch 120. A plurality of 2×1 output switches 136, 138, 140 have inputs connected to the output sides of the active optical switch 108 and the protection optical switch 112. A first egress fiber 144 receives output from the first 2×1 output switch 136. A second egress fiber 146 receives output from the second output switch 138. An nth ingress fiber 148 receives output from the nth output switch 140. In this example, n may be 256 for a 256×256 optical switch.

In operation, the active optical switch 108 is normally used to provide switching, while the protection optical switch 112 may be used as a backup, if the active optical switch 108 malfunctions. During such an operation, a first signal from a user may be placed through the first ingress fiber 124 to the first input switch 116. During normal operation, the first input switch 116 directs the first signal to the active optical switch 108, which directs the signal to one of the output switches 136, 138, 140, which for example may be the first output switch 136. The first output switch 136 directs the first signal to the first egress fiber 144. Similarly, a second signal may pass from the second ingress fiber 126 through the second input switch 118 to the active optical switch 108. The active optical switch 108 may, for example, pass the second signal to the nth output switch 140, which passes the signal to the nth egress fiber 148. Similarly, a third signal may pass from the third ingress fiber 128 through the third input switch 120 to the active optical switch 108. The active optical switch 108 may, for example, pass the third signal to the second output switch 138, which passes the signal to the second egress fiber 146. If a malfunction is detected in the having all of the input switches 116, 118, 120 direct input to the protection optical switch 112 and having all of the output switches 136, 138, 140 receive signals from the protection optical switch.

It is desirable to provide a system that determines whether the protection optical switch or other switches not in current use are properly working.

SUMMARY OF THE INVENTION

To achieve the foregoing and other objects and in accordance with the purpose of the present invention, a variety of techniques for providing an optical switching apparatus is provided. Generally, a plurality of optical input switches is provided. A plurality of optical output switches is provided. A plurality of central optical switches connected between the plurality of input switches and plurality of output switches is provided. A plurality of test light sources, where each test light source is connected to an optical input switch is provided. A first plurality of optical detectors connected to the optical output switches is provided.

In another embodiment of the invention an optical switching apparatus is provided. The switching apparatus has a plurality of optical input switches and a plurality of optical output switches. A plurality of central optical switches is connected between the plurality of input switches and plurality of output switches. A plurality of test light sources is provided, where each test light source is connected to an optical input switch. A first plurality of optical detectors is connected to the optical output switches.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set fourth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

Figure 1:
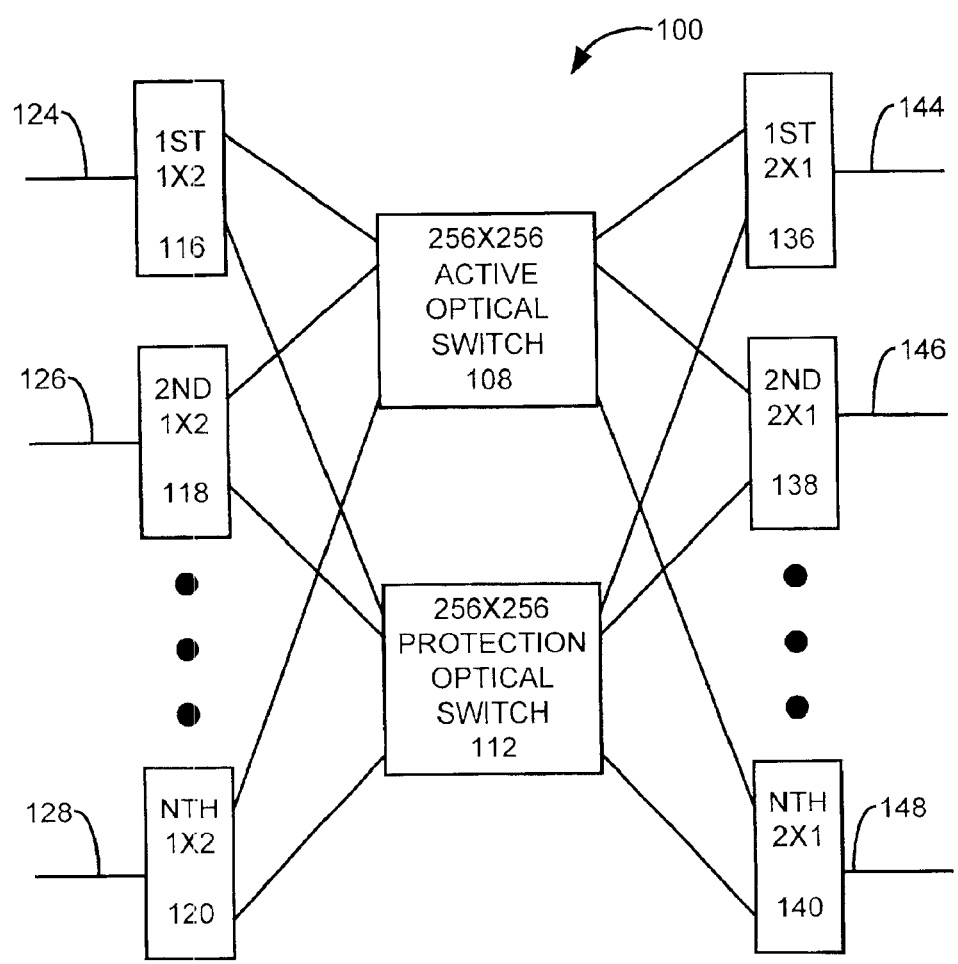
FIG. 1 is a schematic view of a single stage optical network that may be used in the prior art.
Figure 2:
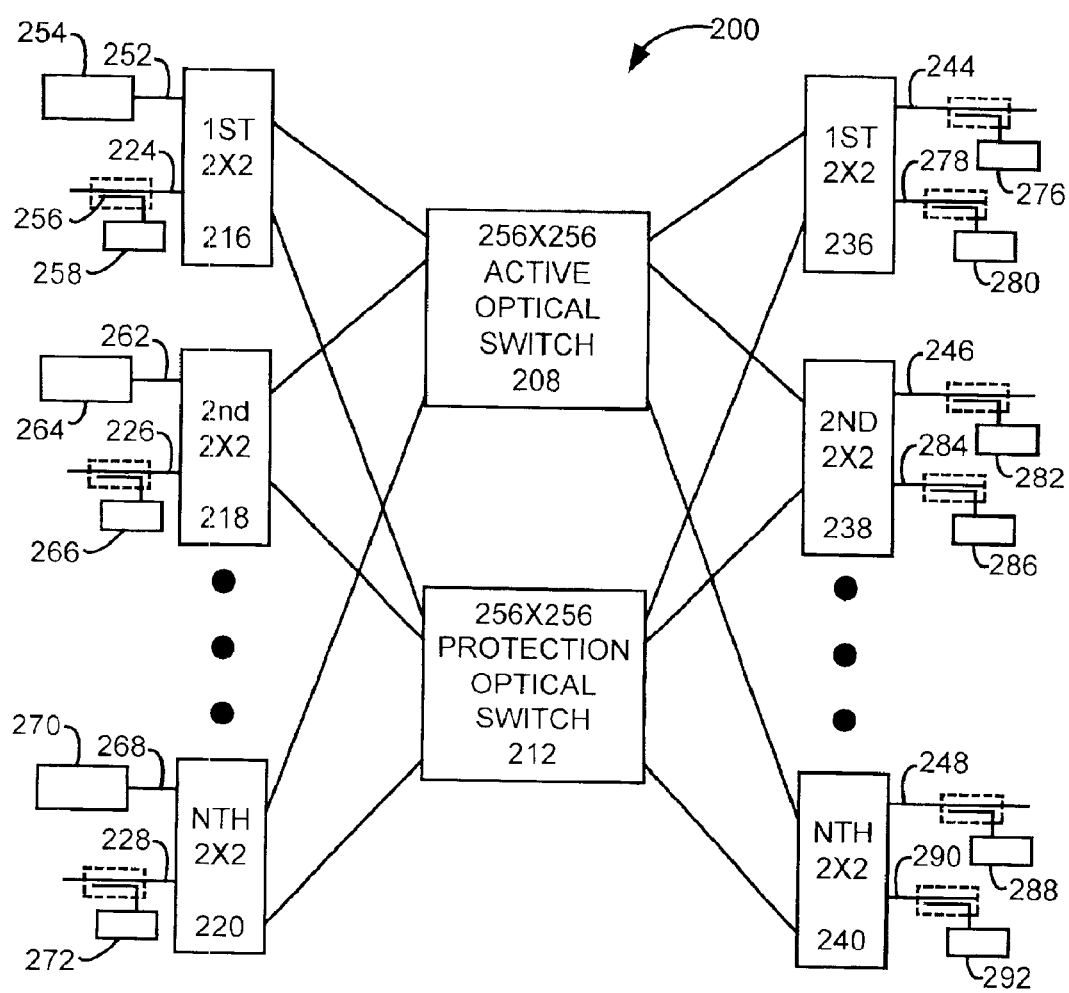
FIG. 2 is a schematic view of a preferred embodiment of the invention for an optical network using a single stage switch.

To facilitate discussion, FIG. 2 is a schematic view of a preferred embodiment of the invention for an optical network 200 using a single state switch. The optical network 200 may comprise a 256×256 active optical switch 208 and a 256×256 protection optical switch 212. The protection optical switch 212 acts as a backup for the active optical switch 208.

A plurality of 2×2 input switches 216, 218, 220 have outputs connected to the input sides of the active optical switch 208 and the protection optical switch 212. A first ingress fiber 224 provides input to the first 2×2 input switch 216. A first laser 254 provides a test signal through a first connector cable 252 to the first 2×2 input switch 216. A first input detector 258 is connected to the first ingress fiber 224 so that some of the signal through the first ingress fiber 224 flows through a detector cable 256 to the first input detector 258. A small fraction of the optical power from the first ingress fiber 224 is coupled to the first input detector 258 using a commercial fiber coupler (detector cable 256), which is based on the principle of evanescent coupling of light through the cladding of two closely spaced optical fiber cores. A second ingress fiber 226 provides input to the second input switch 218. A second laser 264 provides a test signal through a second connector cable 262 to the second 2×2 input switch 218. A second input detector 266 is connected to the second ingress fiber 226 so that some of the signal through the second ingress fiber 226 flows through a detector cable to the second input detector 266. An nth ingress fiber 228 provides input to the nth input switch 220. An nth laser 270 provides a test signal through an nth connector cable 268 to the nth 2×2 input switch 220. An nth input detector 272 is connected to the nth ingress fiber 228 so that some of the signal through the nth ingress fiber 228 flows through a detector cable to the nth input detector 272.

A plurality of 2×2 output switches 236, 238, 240 have inputs connected to the output sides of the active optical switch 208 and the protection optical switch 212. A first egress fiber 244 receives a first output from the first output switch 236. A first signal output detector 276 is connected to the first egress fiber 244 to measure light from the first egress fiber 244. A second output from the first output switch 236 is connected to a first output test detector cable 278, which is connected to a first output test detector 280. An optical attenuator may be connected between the first output detector cable 278 and the first output test detector 280 to provide similar optical power levels to the first signal output detector 276 and the first output test detector 280. A second egress fiber 246 receives output from the second output switch 238. A second signal output detector 282 is connected to the second egress fiber 246 to measure light from the second egress fiber 246. A second output from the second output switch 238 is connected to a second output test detector cable 284, which is connected to a second output test detector 286. An nth ingress fiber 248 receives output from the nth output switch 240. An nth signal output detector 288 is connected to the nth egress fiber 248 to measure light from the nth egress fiber 248. A second output from the nth output switch 240 is connected to an nth output test detector cable 290, which is connected to an nth output test detector 292. For a 256×256 switch, in the preferred embodiment n is 256 providing for 256 input switches, 256 ingress fibers, 256 input detectors, 256 lasers, 256 output switches, 256 egress fibers, 256 signal output detectors, and 256 output test detectors.

Figure 3:
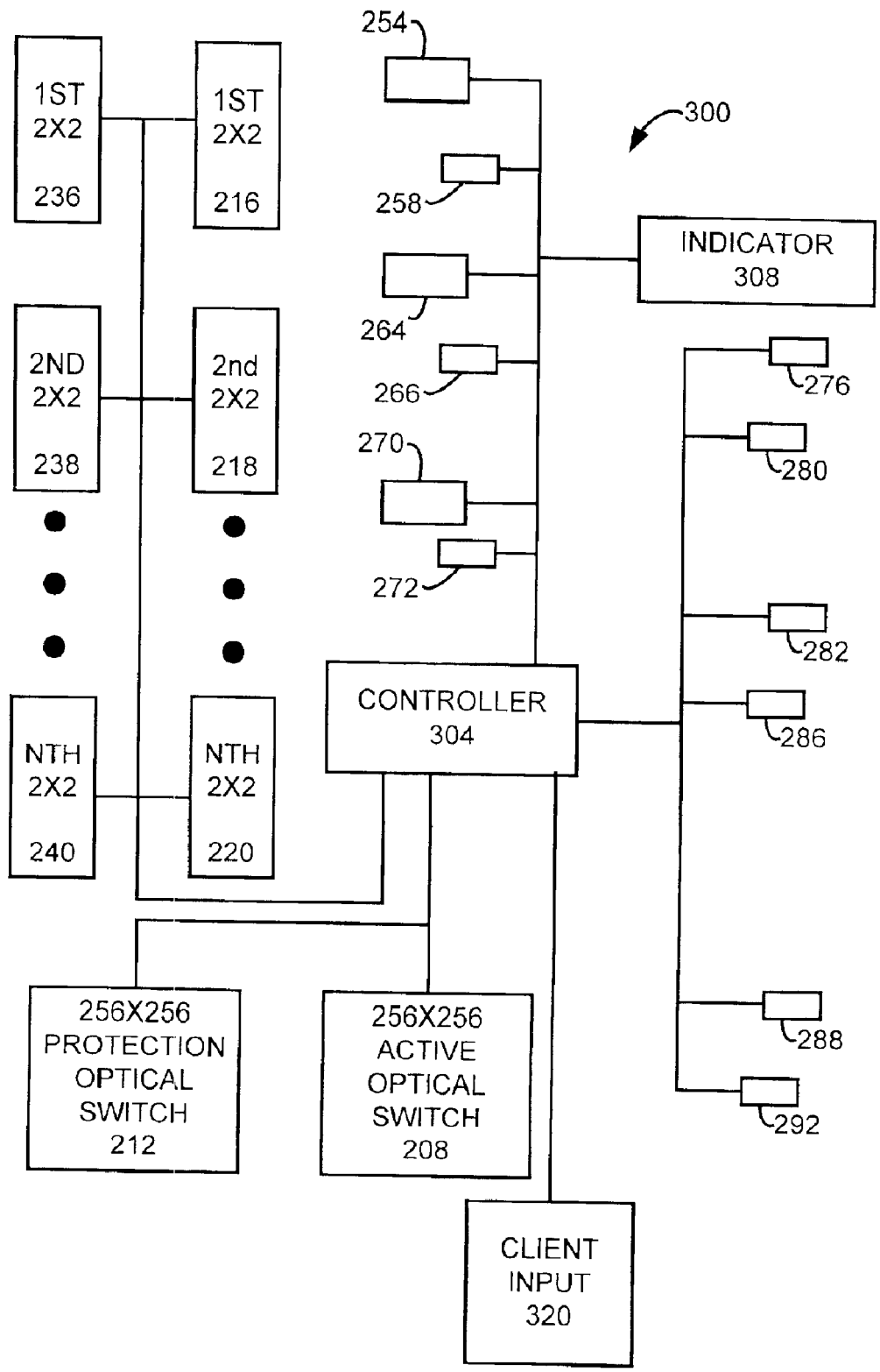
FIG. 3 is a schematic illustration of a computer network 300, which may be connected to the optical network.

FIG. 3 is a schematic illustration of a computer network 300, which may be connected to the optical network. A controller 304, which may comprise one or more computers, is connected to the active optical switch 208, the protection optical switch 212, the first input switch 216, the second input switch 218, up to the nth input switch 220, the first output switch 236, the second output switch 238, up to the nth output switch 240, the first laser 254, the second laser 264, up to the nth laser 270, the first input detector 258, the second input detector 266, up to the nth input detector 272, the first signal output detector 276, the second signal output detector 282, up to the nth signal output detector 288, the first output test detector 280, the second output test detector 286, and up to the nth output test detector 292. The controller 304 may control the active optical switch 208 and the protection switch 212, directing which input for the active and protection optical switches 208, 212 are directed to which output of the active and protection optical switches 208, 212. The controller 304 may receive client input 320, which may be defined as input information which the controller uses to direct the switching of the active optical switch and the protection optical switch. The controller 304 may be connected to an indicator 308.

In operation, the optical network 200 may be tested before the network is placed in service, such as before the optical network 200 leaves the manufacturing facilities. The controller 304 may signal the first, second, and up to the nth lasers 254, 264, 270 to generate signals as input to the first, second, and up to the nth input switches 216, 218, 220. To test the active optical switch 208, the first, second, and up to the nth input switches 216, 218, 220 are set to send output from the first, second, and up to the nth lasers 254, 264, 270 to the active optical switch 208. Output from the active optical switch 208 is directed to the first, second, and up to the nth output switches 236, 238, 240. The first, second, and up to the nth output switches 236, 238, 240 preferably direct the signals to the first, second, and up to the nth output test detectors 280, 286, 292, but may instead direct the signals to the first, second, and up to nth signal output detectors 276, 282, 288. The controller 304 measures the signals from the first, second, and up to nth laser 254, 264, 270 and compares them with the signals detected from the first, second, and up to the nth output test detectors 280, 286, 292 or the first, second, and up to nth signal output detectors 276, 282, 288 and the switching commands sent from the controller to the active optical switch to determine whether the active optical switch 208 is working properly.

To test the protection optical switch 212, the first, second, and up to the nth input switches 216, 218, 220 are set to send output from the first, second, and up to the nth lasers 254, 264, 270 to the protection optical switch 212. Output from the protection optical switch 212 is directed to the first, second, and up to the nth output switches 236, 238, 240. The first, second, and up to the nth output switches 236, 238, 240 preferably direct the signals to the first, second, and up to the nth output test detectors 280, 286, 292, but may instead direct the signals to the first, second, and up to nth signal output detectors 276, 282, 288. The controller 304 measures the signals from the first, second, and up to nth laser 254, 264, 270 and compares them with the signals detected from the first, second, and up to the nth output test detectors 280, 286, 292 or the first, second, and up to nth signal output detectors 276, 282, 288 and the switching commands sent from the controller to the active optical switch to determine whether the active optical switch 208 is working properly.

This testing allows a manufacturer the ability to certify the network when the network leaves the manufacturing facility. It also allows a wholesaler or installer to be able to certify the network when they receive the network and when they ship the network out or just before installation, so that a faulty network does not go through an installation procedure and to determine whether a malfunction was caused by installation.

After installation, the system is able to test both the active optical switch 208 and the protection switch 212 when the system is not in service or when the active optical switch 208 or protection switch 212 is in service. The testing of both the active optical switch 208 and the protection optical switch 212 when the system is not in service is the same procedure for testing before the network is installed, as described above.

To test the active optical switch 208, while the active optical switch is in service, is performed when signals are being provided through the first, second, and up to the nth ingress fibers 224, 226, 228 to the first, second, and up to the nth input switches 216, 218, 220. The first, second, and up to the nth input switches 216, 218, 220 are set by the controller 304 to direct the signals from the first, second, up to the nth ingress fibers 224, 226, 228 to the active optical switch 208. The first, second, and up to the nth input detectors 258, 266, 272 measure the signals passed through the first, second and up to the nth ingress fibers 224, 226, 228, and generate a signal which is passed to the controller 304. The controller 304 may control the active optical switch so that input from various input switches is directed to the input side of various output switches. The first, second, and up to the nth output switches 236, 238, 240 direct the signals from the active optical switch 208 to the first, second, and up to the nth egress fibers 244, 246, 248. The first, second, and up to the nth signal output detectors 276, 282, 288 detect signals passing through the first, second, and up to the nth egress fibers 244, 246, 248. By measuring the signals detected by the first, second, and up to the nth input detectors 258, 266, 272 and the signals detected by the first, second, and up to the nth signal output detectors 276, 282, 288 and from the control signals to the active optical switch 208, the controller 304 is able to detect whether the active optical switch 208 is working properly.

If a malfunction is detected in the active optical switch 208, the controller 304 sends a signal to the first, second, and up to the nth input switches 216, 218, 220 to send signals from the first, second, and up to the nth ingress fibers 224, 226, 228 to the protection optical switch 212. The controller 304 also sends signals to the first, second, and up to the nth output switches 236, 238, 240 to send signals from the protection optical switch 212 to the first, second, and up to the nth egress fibers 244, 246, 248. The controller 304 may also send a signal to the indicator 308 to notify a user that the active optical switch 208 is malfunctioning.

To test the protection optical switch 212, while the active optical switch is in service, is performed when signals are being provided through the first, second and up to the nth ingress fibers 224, 226, 228. The first, second, and up to the nth lasers 254, 264, 270 provide signals through the connector cables to the first, second, and up to the nth input switches 216, 218, 220. The first, second, and up to the nth input switches 216, 218, 220 are set by the controller 304 to direct the signals from the connector cables 252, 262, 268 to the protection optical switch 212. The controller 304 may control the protection optical switch 212 so that input from various input switches is directed to the input side of various output switches. The first, second, and up to the nth output switches 236, 238, 240 direct the signals from the protection optical switch 212 to the first, second, and up to the nth output test detector fibers 278, 284, 290. The first, second, and up to the nth output test detectors 280, 286, 292 detect signals passing through the first, second, and up to the nth output test detector fibers 278, 284, 290. By measuring the signals detected by the first, second, and up to the nth output test detectors 280, 286, 292 and from the control signals to the first, second, and up to the nth lasers 254, 264, 270 and the protection optical switch 212, the controller 304 is able to detect whether the protection optical switch 212 is working properly.

If a malfunction is detected in the protection optical switch 212, while the active optical switch 208 is in use, the controller may signal an administrator through the indicator 308 regarding the malfunction, so that the protection optical switch 212 may be replaced. The continuous testing of the protection optical switch 212 provides a more reliable backup system. This testing allows the switches and optical paths to be tested on a millisecond by millisecond basis, so that if a particular optical path must be used there is a high degree of confidence that the optical path and related switching will work. This embodiment not only allows the monitoring of the switches but also the optical pathways over optical fibers. If an optical fiber malfunctions, such as breaks, so that light may not pass through it, this embodiment of the invention will be able to detect this.

In one embodiment the controller 304 switches active optical switch 208 and the protection optical switch 212 together in parallel. In another embodiment, the controller 304 switches the active optical switch 208 and the protection optical switch 212 separately.

Figure 4:
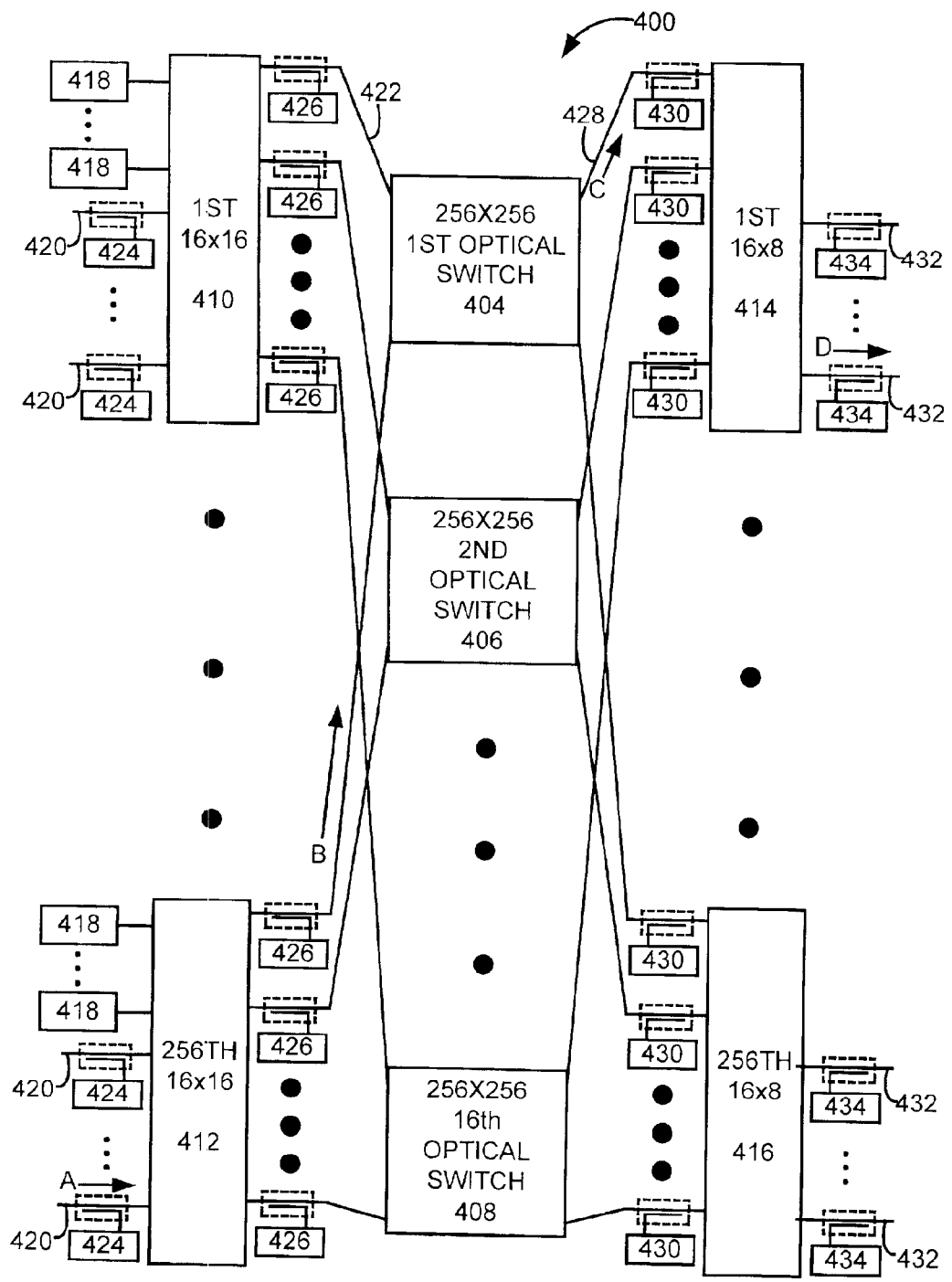
FIG. 4 is a schematic illustration of a three stage Clos switch configuration.

FIG. 4 is a schematic illustration of a three stage, such as a CLOS switch configuration 400. In this example, 16 256×256 center stage optical switches 404, 406, 408 are used as center-stage switches. There are 256 16×16 input switches 410, 412 and 256 16×8 output switches 414, 416. For each input switch 410, 412 there are eight lasers 418 to provide input and eight ingress fibers 420 to provide input to the input switch. Input detectors 424 are provided for each ingress fiber 420 to measure the signal on each ingress fiber 420. There are 16 output fibers 422 for each input switch 410, 412 so that each output fiber 422 of an input switch provides an input to a different center stage optical switch 404, 406, 408. Center stage input detectors 426 are provided on each output fiber 422 to measure the input to each of the center stage optical switches 404, 406, 408. Each center stage optical switch 404, 406, 408 has 256 output cables 428, so that each center stage optical switch 404, 406, 408 has an output cable 428 that provides input to each of the 256 output switches 414, 416. 4096 center stage output cable detectors 430 are provided so that each center stage output cable 428 has a center stage output detector 430 to measure the signal in the center stage output cable 428. Each output switch 414, 416 has eight egress fibers 432, where each egress fiber 432 has an egress fiber detector 434 to measure the signal in the egress fiber 432. The output cables 428 are optical fibers. The term "cable" is used so that they may be distinguished from the output fibers of the input switches.

This three stage switch configuration has 2048 ingress fibers 420 for the 256 input switches 410, 412. The center stage optical switches have 4096 inputs and 4096 outputs.

Preferably there are twice as many inputs and outputs in the center stage and internal switches to provide connections through the center stage than ingress fibers to provide a 100% guarantee a connection would be available for any signal coming through on an ingress fiber. This also results in only half of the inputs in the center stage being used by signals from the ingress fibers at one time.

Figure 5:
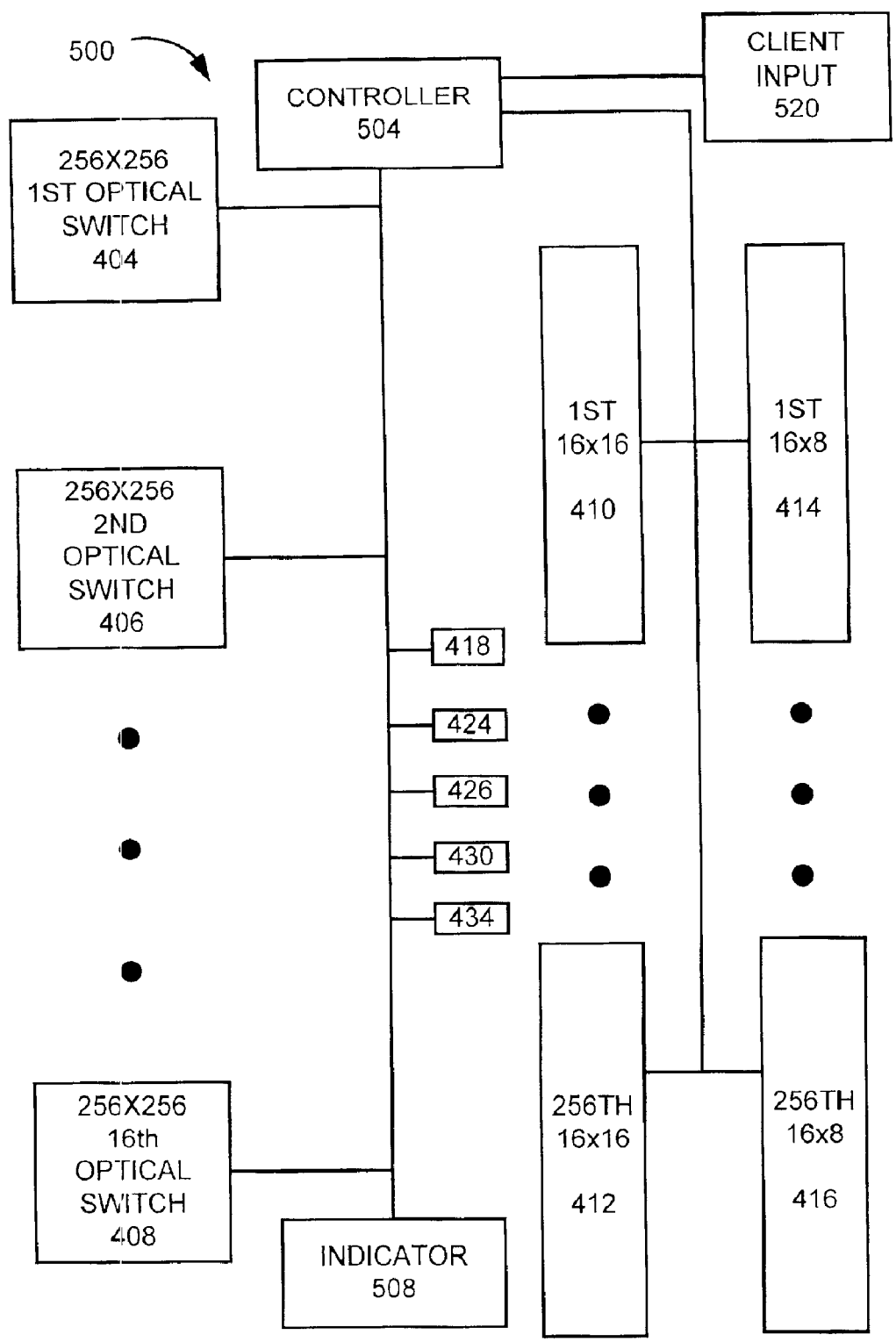
FIG. 5 is a schematic illustration of a computer network, which may be connected to the optical network.

FIG. 5 is a schematic illustration of a computer network 500, which may be connected to the optical network 400. A controller 504, which may comprise one or more computers, is connected to the center stage optical switches 404, 406, 408, the input switches 410, 412, the output switches 414, 416, the lasers 418, the input detectors 424, the center stage input detectors 426, the center stage output detectors 430, and the egress fiber detectors 434. An indicator 508 is also connected to the controller 504. In the preferred embodiment, the controller 504 is connected to a controller of the input signals and output signals to provide instructions to the controller 504 on which signal on an ingress fiber 420 should be switched to which egress fiber 432. The controller 504 may receive client input 520, which may be defined as input information which the controller 504 may use to direct the switching of the center stage optical switches 404, 406, 408, the input switches 410, 412, and the output switches 414, 416.

In operation, the lasers 418 may be used to test the center stage optical switches 404, 406, 408, the input switches 410, 412, and the output switches 414, 416 before the switch configuration 400 is placed in service. The input switches 410, 412 are switched by the controller 504 to various settings so that signals from the lasers 418 may pass through all of the output fibers 422 for all of the input switches 410, 412. The center stage input detectors 426 determine if signals from the lasers 418 are switched to all of the output fibers. If a signal is not detected through an output fiber 422 of an input switch then this indicates a failure from an input switch 410, 412 connected to the output fiber 422 of the input switch or one of the lasers 418 connected to the input switch. The controller 504 may send a signal to the indicator 508, which indicates to a user which input switch 410, 412 is malfunctioning, so that the user may replace the malfunctioning input switch.

Next, center stage optical switches 404, 406, 408 may be tested. The center stage optical switches 404, 406, 408 are switched to various settings by the controller 504 so that signals from various output fibers 422 of the input switches are switched to various center stage output cables 428. The output cable detectors 430 are used to detect whether signals are actually being switched to the various center stage output cables 428. If a signal is not detected by an output cable detector 430, but a corresponding center stage input detector 426 detects an input signal, then this indicates a failure of a center stage optical switch 404, 406, 408. The malfunctioning center stage optical switch 404, 406, 408 may be easily identified as the center stage optical switch connected to an output fiber 422 through which an input signal is detected and a corresponding output cable 428 through which no output signal is detected. The controller 504 may send a signal to the indicator 508, which indicates to a user which center stage optical switch 404, 406, 408 is malfunctioning, so that the user may replace the malfunctioning center state optical switch. By setting up various paths through the malfunctioning switch, it may be determined if an input port or output port is malfunctioning based on which other connections can be made through that switch.

Next the output switches 414, 416 may be tested. The output switches 414, 416 are switched to various settings by the controller 504 so that signals from the various output cables 428 are switched to various egress fibers 432. The output cable detectors 430 and egress fiber detectors 434 are used to detect whether signals are actually being switched to the various egress fibers 432. If a signal is detected by an output cable detector, but is not detected by a corresponding egress fiber detector 434 then this indicates a failure of the output switch 414, 416. The malfunctioning output switch may be easily identified as the output switch connected between the output cable 428 through which a signal is detected and the corresponding egress fiber 432 through which no output signal is detected. The controller 504 may send a signal to the indicator 508, which indicates to a user which output switch 414, 416 is malfunctioning, so that the user may replace the malfunctioning output switch.

When placed in service, input signals are provided through the ingress fibers 420. Instructions may be provided, such as through the client input 520, to the controller 504 as to which particular ingress fiber 420 should be optically connected to which particular egress fiber 432, so that a signal from the ingress fiber 420 will be passed to the egress fiber 432. The controller 504 then switches the input switches, center stage switches, and output switches to provide the optical connection. With 2048 ingress fibers 420, preferably the controller 504 is able to control the input switches 410, 412, center stage switches 404, 406, 408, and output switches 414, 416 to be able to handle as many as 2048 input signals. The input detectors 424, center stage input detectors 426, center stage output detectors 430, and the egress fiber detectors 434 measure the signals along each optical path to determine whether the input switches, center stage switches, and output switches are properly functioning for signals entering through the ingress fibers 420.

In an example of an optical connection which creates an optical path, an ingress fiber 420 has an input signal indicated by the arrow A providing input to the 256th input switch 412. The 256th input switch 412 switches the input signal indicated by arrow A to an output fiber 422 with the signal indicated by the arrow B, which is connected to the 1st optical switch 404. The 1st optical switch 404 switches the signal to an output cable 428 connected to the 1st output switch 414 as indicated by arrow C. The output switch 414 switches the signal to the egress fiber 432 indicated by arrow D. (Remember to add these arrows to FIG. 5) As mentioned above the center stage optical switches have a total of 4096 inputs and 4096 outputs for the three-stage switch network of FIG. 4 with a maximum of 2048 input signals. Preferably there are twice as many inputs and outputs in the center stage to provide connections through the center stage than ingress fibers to provide a 100% guarantee a connection would be available for any signal coming through on an ingress fiber. This also results in only half of the inputs in the center stage being used by signals from the ingress fibers 420 at one time, which means only half of the possible connections provided by the switch configuration 400 may be used and tested by input signals at one time. Therefore, the lasers 418 are used to test the remaining optical paths over output fibers 422 and output cables 428 which are not in use. The controller 504 controls the input switches, center stage switches, and output switches so that signals from the lasers 418 pass over the output fibers 422 and output cables 428, which are not in use. The center stage input detectors 426 and center stage output detectors 428 measure the signals over the output fibers 422 and output cables 428 to determine whether the input switches, center stage switches, and output switches are properly functioning for signals from the lasers 418.

If an input switch 410, 412, center stage switch 404, 406, 408, or output switch 414, 416 is found to be malfunctioning, the controller 504 may send a signal to the indicator to indicate to a user which switch is malfunctioning. More preferably, if possible, the controller 504 may also reroute signals, which pass through the ingress fibers 420 to avoid the malfunctioning switch. Since there are twice as many possible connections as ingress fibers 420, this may be done to some degree, which allows the switch configuration 400 to function in some capacity, until a user is able to replace the malfunctioning switch.

In another embodiment, the controller may avoid using one of the center stage switches 404, 406, 408 to save the switch as a backup center stage switch. The lasers 418 may be used to test this backup center stage for redundant connection paths corresponding to the connection paths of each of the other active center-stage switches. If a malfunction is detected for a center stage switch, the controller switches all of the optical paths from the malfunctioning center stage switch to the backup center stage switch.

Figure 6:
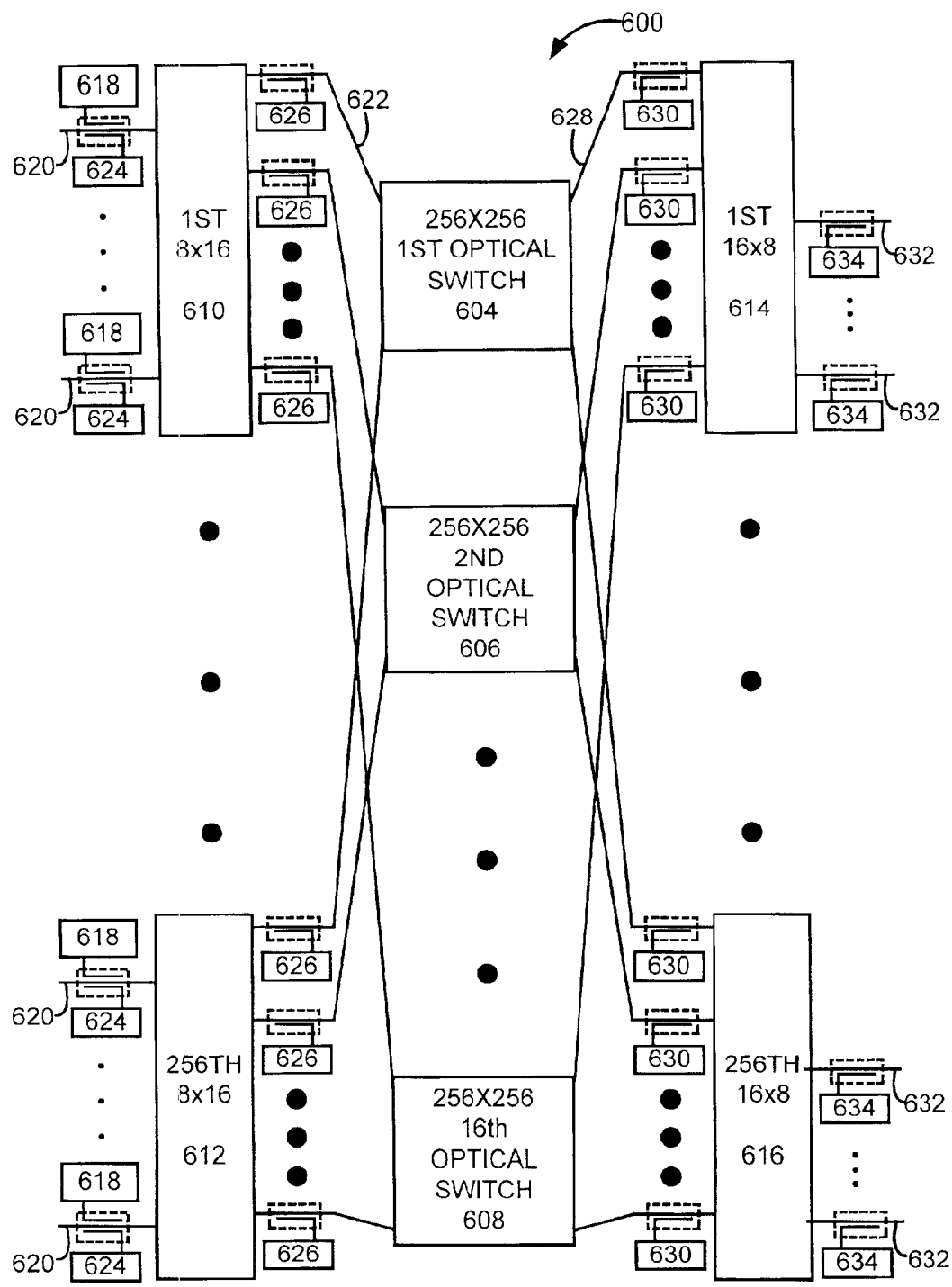
FIG. 6 is a schematic illustration of a three stage switch configuration, used in another embodiment of the invention.

FIG. 6 is a schematic illustration of a three stage switch configuration 600, used in another embodiment of the invention. In this example, 16 256×256 center stage optical switches 604, 606, 608 are used as center-stage switches. There are 256 8×16 input switches 610, 612 and 256 16×8 output switches 614, 616. For each input switch 610, 612 there are eight ingress fibers 620 to provide input to the input switch. Each ingress fiber 620 is coupled to a test laser 618, so that each ingress fiber 620 may receive light input from an input signal or from a test laser 618. Input detectors 624 are provided for each ingress fiber 620 to measure the signal on each ingress fiber 620. There are 16 output fibers 622 for each input switch 610, 612 so that each output fiber 622 of an input switch provides an input to a different center stage optical switch 604, 606, 608. Center stage input detectors 626 are provided on each output fiber 622 to measure the input to each of the center stage optical switches 604, 606, 608. Each center stage optical switch 604, 606, 608 has 256 output cables 628, so that each center stage optical switch 604, 606, 608 has an output cable 628 that provides input to each of the 256 output switches 614, 616. Center stage output cable detectors 630 are provided so that each center stage output cable 628 has a center stage output detector 630 to measure the signal in the center stage output cable 628. Each output switch 614, 616 has eight egress fibers 632, where each egress fiber 632 has an egress fiber detector 634 to measure the signal in the egress fiber 632. The output cables 628 are optical fibers. The term "cable" is used so that they may be distinguished from the output fibers of the input switches.

As illustrated in the previous embodiment, a controller, which may comprise one or more computers, may be connected to the center stage optical switches 604, 606, 608, the input switches 610, 612, the output switches 614, 616, the lasers 618, the input detectors 624, the center stage input detectors 626, the center stage output detectors 630, and the egress fiber detectors 634. An indicator is also connected to the controller. In the preferred embodiment, the controller is connected to a client input to provide information to the controller on which signal on an ingress fiber should be switched to which egress fiber.

In operation, the lasers 618 may be used to test the center stage optical switches 604, 606, 608, the input switches 610, 612, and the output switches 614, 616 before the switch configuration 600 is placed in service. The testing in this embodiment is similar to the testing in the previous embodiment, with the main difference being that instead of applying the test signals from the lasers through a connecting fiber between the lasers and the input switches, the test signals from the lasers 618 are applied to through the ingress fibers 620. This is because the lasers 618 are coupled to the input optical switches 610, 612 through the ingress fibers 620 in this embodiment. This allows the testing of the ingress fibers 620.

While in service testing of the center stage optical switches 604, 606, 608, the input switches 610, 612, and the output switches 614, 616 is performed less frequently than in the previous embodiment. This is because lasers 618 share common ingress fibers 620 with the input signal. While input is being provided by an input signal over an ingress fiber 620, the laser 618 connected to the same ingress fiber 620 is not used for testing, to avoid interference with the input signal. However the optical path of the input signal may be measured by the input detectors 624, the center stage input detectors 626, the center stage output detectors 630, and the egress fiber detectors 634 to determine whether the switches work over the optical path traversed by the input signal. When an ingress fiber 620 is not receiving an input signal, a laser 618 coupled to the ingress fiber 620 may provide a test light signal over the ingress fiber 620. The test light signal may be used to test various optical paths, where the input detectors 624, the center stage input detectors 626, the center stage output detectors 630, and the egress fiber detectors 634 are used to determine whether the switches work over the optical path traversed by the test light signal.

This embodiment allows for fewer inputs into the input switches. This allows the use of smaller input switches. This embodiment does not provide testing of switches over optical paths as frequently as the previous embodiment.

Figure 7:
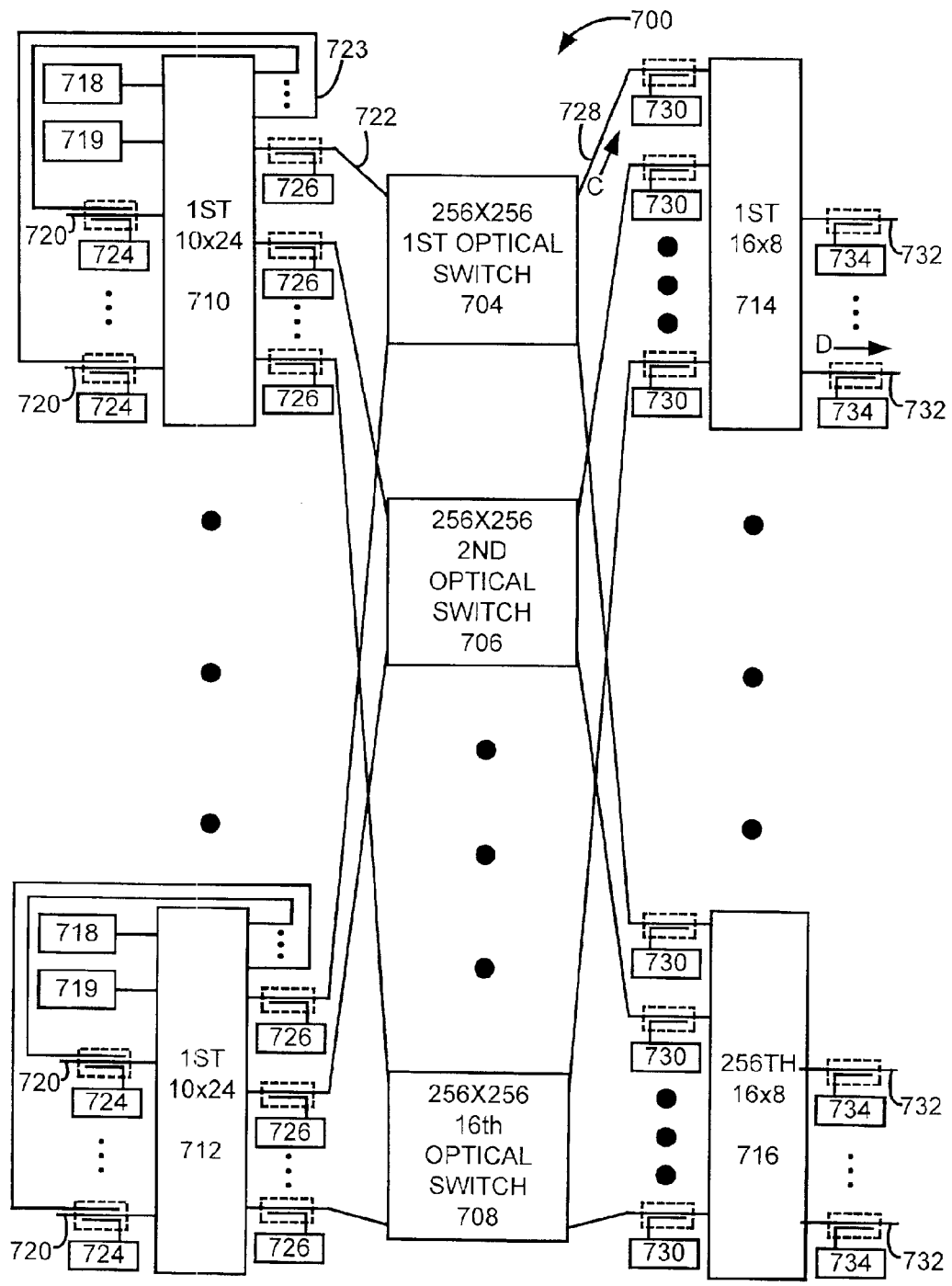
FIG. 7 is a schematic illustration of a three stage Clos switch configuration, used in another embodiment of the invention.

FIG. 7 is a schematic illustration of a three stage Clos switch configuration 700, used in another embodiment of the invention. In this example, 16 256×256 center stage optical switches 704, 706, 708 are used as center-stage switches. There are 256 10×24 input switches 710, 712 and 256 16×8 output switches 714, 716. For each input switch 710, 712 there are eight ingress fibers 720 to provide input to the input switch. In this embodiment, a first test light source 718 and a second test light source 719 are connected to the input side of each input switch 710, 712. Input detectors 724 are provided for each ingress fiber 720 to measure the signal on each ingress fiber 720. There are a total of 24 outputs for each input switch 710, 712. There are 16 output fibers 722 for each input switch 710, 712 so that each output fiber 722 of an input switch provides an input to a different center stage optical switch 704, 706, 708 and 8 return fibers 723, which are connected to the output side of an input switch 710, 712 and optically coupled to an ingress fiber 720, so that each ingress fiber 720 is optically coupled to a return fiber 723. Center stage input detectors 726 are provided on each output fiber 722 to measure the input to each of the center stage optical switches 704, 706, 708. Each center stage optical switch 704, 706, 708 has 256 output cables 728, so that each center stage optical switch 704, 706, 708 has an output cable 728 that provides input to each of the 256 output switches 714, 716. Center stage output cable detectors 730 are provided so that each center stage output cable 728 has a center stage output detector 730 to measure the signal in the center stage output cable 728. Each output switch 714, 716 has eight egress fibers 732, where each egress fiber 732 has an egress fiber detector 734 to measure the signal in the egress fiber 732. The output cables 728 are optical fibers. The term "cable" is used so that they may be distinguished from the output fibers of the input switches.

As illustrated in previous embodiments, a controller, which may comprise one or more computers, may be connected to the center stage optical switches 704, 706, 708, the input switches 710, 712, the output switches 714, 716, first test light sources 718, the second test light sources 719, the input detectors 724, the center stage input detectors 726, the center stage output detectors 730, and the egress fiber detectors 734. An indicator is also connected to the controller. In the preferred embodiment, the controller is connected to a client input to provide information to the controller which ingress fiber should be switched to which egress fiber.

In operation, the first test light sources 718 and the second test light sources 719 may be used to test the center stage optical switches 704, 706, 708, the input switches 710, 712, and the output switches 714, 716 before the switch configuration 700 is placed in service. The testing in this embodiment is similar to the testing in the previous embodiments, with the main difference being that instead of having eight lasers per input optical switch, there are only two lasers per input optical switch, which means it may take longer to test the switches. In addition, the return fibers 723 may be used to direct output from an input switch generated from the first or second test light sources 718, 719 to an ingress fiber 720, to test an optical path through the ingress fiber 720.

While in service testing of the center stage optical switches 704, 706, 708, the input switches 710, 712, and the output switches 714, 716 may be performed less frequently than at least one of the previous embodiments. This is because there are only two test light sources per input switch. This embodiment allows a test light signal to be generated by the first test light source 718 or the second test light source 719 and to be directed by the optical input switch 710, 712 to an output fiber 722, to test an optical path that is traversed by the test light signal and that is not in use by an input signal. Optical paths of the input signals may also be measured by the input detectors 724, the center stage input detectors 726, the center stage output detectors 730, and the egress fiber detectors 734 to determine whether the switches work over the optical path traversed by the input signal. When an ingress fiber 720 is not receiving an input signal, the return fibers 723 may be used to provide a test light signal over the ingress fiber 720, where the test light signal is generated by the first test light source 718 or the second test light source 719. The test light signal may be used to test various optical paths, where the input detectors 724, the center stage input detectors 726, the center stage output detectors 730, and the egress fiber detectors 734 are used to determine whether the switches work over the optical path traversed by the test light signal.

This embodiment allows for a reduction in the number of test light sources, such as lasers. It also provides the testing of an optical path that actually tests a path through the ingress fibers. This embodiment may not provide testing of switches over optical paths as frequently as one of the previous embodiments.

This embodiment of the invention allows the testing and monitoring of switches while in use and while not in use, and indicates if a switch is malfunctioning and allows the replacement of such a switch while the switch configuration continues to function.

Although in the embodiments described above the lasers are used as test light sources, other test light sources such as diodes may be used, as long as such test light sources provide sufficient light to be measured by the detectors. In addition, the test light sources may be a different wavelength than the anticipated input fiber light source so that the test light source does not interfere with the input fiber light source.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An optical switching apparatus, comprising:
   a plurality of optical input switches;
   a plurality of optical output switches;
   a plurality of central optical switches connected between the plurality of input switches and plurality of output switches;
   a plurality of test light sources, where each test light source is connected to an optical input switch;
   a first plurality of optical detectors connected to the optical output switches; and
   a controller connected to each of the plurality of optical input switches, the plurality of optical output switches, the plurality of central optical switches, the plurality of test light sources, and the first plurality of optical detectors, and wherein at least one of the plurality of central optical switches is an active optical switch and at least one of the plurality of central optical switches is a protection optical switch which acts as a back up for the active optical switch, wherein the controller determines if one of the plurality of central optical switches is malfunctioning, by simultaneously using input signals, which are not generated by the test light sources, to test the active optical switch and the test light sources to test the protection optical switch.

2. The optical switching apparatus, as recited in claim 1, wherein each of the plurality of optical input switches has input connections and output connections, and each of the plurality of optical output switches has input connections and output connections, and each of the plurality of central optical switches has input connections and output connections, further comprising:
   a first plurality of optical fibers connected between the output connections of the input switches and the input connections of the central optical switches;
   a second plurality of optical fibers connected between the output connections of the central optical switches and the optical output switches;
   a third plurality of optical fibers connected to the input connections of the optical input switches, wherein each test light source of the plurality of test light sources is connected to an optical fiber of the third plurality of optical fibers; and
   a fourth plurality of optical fibers connected to the output connections of the optical output switches, wherein each detector of the first plurality of optical detectors is connected to an optical fiber of the fourth plurality of optical fibers.

3. The optical switching apparatus, as recited in claim 2, further comprising a second plurality of optical detectors, wherein each optical detector of the second plurality of optical detectors is connected to an optical fiber of the third plurality of optical fibers.

4. The optical switching apparatus, as recited in claim 3, further comprising a third plurality of optical detectors, wherein each optical detector of the third plurality of optical detectors is connected to an optical fiber of the first plurality of optical fibers.

5. The optical switching apparatus, as recited in claim 2, wherein each of the plurality of optical input switches is connected to at least eight fibers of the third plurality of fibers.

6. The optical switching apparatus, as recited in 1, further comprising an indicator connected to the controller which indicates if a central optical switch is malfunctioning.

7. The optical switching apparatus, as recited in claim 1, wherein each optical input switch of the plurality of optical input switches is connected to a test light source.

8. The switching apparatus, as recited in claim 1, wherein the controller causes the entire protection optical switch to replace an entire active optical switch if the controller determines the active optical switch is malfunctioning.

9. The switching apparatus, as recited in claim 1, wherein the controller further uses the plurality of test light sources to test the active optical switch, when input lights are not present.

10. The switching apparatus, as recited in claim 1, wherein individual paths of the protection optical switch are used to replace individual paths of the active optical switch when the controller determines that individual paths of the active optical switch are malfunctioning.

11. An optical switching apparatus, comprising:
  a plurality of optical input switches;
  a plurality of optical output switches;
  a plurality of central optical switches connected between the plurality of input switches and plurality of output switches;
  a plurality of test light sources, where each test light source is connected to an optical input switch;
  a first plurality of optical detectors connected to the optical output switches, wherein each of the plurality of optical input switches has input connections and output connections, and each of the plurality of optical output switches has input connections and output connections, and each of the plurality of central optical switches has input connections and output connections;
  a first plurality of optical fibers connected between the output connections of the input switches and the input connections of the central optical switches;
  a second plurality of optical fibers connected between the output connections of the central optical switches and the optical output switches;
  a third plurality of optical fibers connected to the input connections of the optical input switches, wherein each test light source of the plurality of test light sources is connected to an optical fiber of the third plurality of optical fibers;
  a fourth plurality of optical fibers connected to the output connections of the optical output switches, wherein each detector of the first plurality of optical detectors is connected to an optical fiber of the fourth plurality of optical fibers; and
  a controller connected to each of the plurality of optical input switches, wherein the controller determines if one of the plurality of central optical switches is malfunctioning by testing a first plurality of optical paths using the test light sources and by simultaneously testing a second plurality of optical paths using input signals, which are not generated by the test light sources.

12. The optical switching apparatus, as recited in claim 6, further comprising an indicator connected to the controller which indicates if a central optical switch is malfunctioning.

* * * * *

UNITED STATES PATENT AND TRADEMARK OFFICE
CERTIFICATE OF CORRECTION

PATENT NO. : 6,950,215 B2 Page 1 of 1
DATED : September 27, 2005
INVENTOR(S) : Fant et al.

It is certified that error appears in the above-identified patent and that said Letters Patent is hereby corrected as shown below:

<u>Column 2,</u>
Line 6, after "detected in the." add -- active optical switch 108, the active optical switch may be removed from service by --.

Signed and Sealed this

Fourth Day of April, 2006

JON W. DUDAS
*Director of the United States Patent and Trademark Office*